Patented May 8, 1928.

1,669,297

UNITED STATES PATENT OFFICE.

RICHARD HERZ AND FRITZ SCHULTE, OF FRANKFORT-ON-THE-MAIN, AND WERNER ZERWECK, OF FECHENHEIM, NEAR FRANKFORT-ON-THE-MAIN, GERMANY, ASSIGNORS TO GRASSELLI DYESTUFF CORPORATION, OF NEW YORK, N. Y., A CORPORATION OF DELAWARE.

PROCESS FOR CONVERTING CYANNAPHTHALENE-SULPHONIC ACIDS.

No Drawing. Original application filed February 24, 1927, Serial No. 170,732, and in Germany May 17, 1926. Divided and this application filed November 10, 1927. Serial No. 232,468.

This application is a division of our application Serial No. 170,732, filed February 24th, 1927.

We have found, that if cyannaphthalene-sulphonic acids, containing at least one sulphonic group in ortho-or para-position to the cyanic group, are treated with an alkaline acting agent at elevated temperatures, this sulphonic group, standing in ortho or para position to the cyanic group, is easily exchanged to other monovalent radicles.

The products of conversion thus obtained correspond to the general formula:

in which formula the group OY stands in ortho or para position to the group Z, the X's mean hydrogen atoms, of which one or more may be replaced by a monovalent substituent, Y means hydrogen or an alkyl residue, Z the groups CN, $CONH_2$ and COOH.

The general formula shows the range of substances, obtained according to the conditions applied. By acting with milder acting alkaline agents, the cyangroup of the employed cyannaphthalenesulphonic acids remains unattacked and hydroxy-cyannaphthalene-compounds are formed corresponding to the above formula, Y being hydrogen and Z being CN, by acting with stronger alkaline acting agents the cyangroup is saponified to the carboxyamido ($Z=CONH_2$ in this case) or to the carboxy-group ($Z=COOH$ in this case) whereas the sulphonic group is exchanged by hydroxyl (OH) when the applied alkaline acting agent is an aqueous caustic alkali, or by an alkoxy-group, generally when applying caustic alkalis in presence of an alcohol. This latter reaction by which an alkoxy-group is introduced in the molecule, is a particularly remarkable one without any analogy in the naphthalene series. In this manner especially alkoxynaphthalenecarboxyamids corresponding to the above formula, Z being $CONH_2$ and Y being an alkyl-residue, and hydroxy- and alkoxynaphthoic acids are obtained corresponding to the above formula, Z being COOH and Y being hydrogen or an alkylresidue.

Under the term "alkaline acting agents" we understand caustic alkalies in presence of water or of an alcohol, acting either at ordinary pressure or in a closed vessel at elevated pressure. Under milder acting alkaline agents the following have been found especially suitable: basic alkaline salts such as sodium formiate, acetate, borate, phosphate. Such agents, the caustic alkalies as well as the milder acting agents may be used advantageously in presence of inorganic or organic diluents in order to keep the mass homogeneous and easily liquid, such as paraffine, naphthalenue, tertiary aromatic bases as dimethylaniline or N-alkyl-carbazol, higher fatty acids, glycerine or low melting salts.

The aforesaid reactions take place at remarkable low temperatures, namely at about 80–250°, whereas Royle and Shedler and Butler and Royle (see Journ. of Chem. Soc. London, vol. 123, pages 1641, 1649) must apply temperatures above 260 to 300° for exchanging the sulphonic group by the hydroxylgroup in the corresponding carboxy-naphthalene-sulphonic acids.

The starting materials for these reactions, namely the ortho- and para-cyannaphthalenesulphonic acids and their nuclear substitution products, particularly those, containing a halogen or a further sulphonic group in the nucleus, are obtainable by diazotizing the corresponding aminonaphthalenesulphonic acids and treating the diazocompounds, thus obtained, with cuprous cyanide, according to Sandmeyer's reaction.

All products of conversion, derived therefrom, are important intermediates for the production of dyestuffs and pharmaceutical products.

In order to further illustrate our invention the following examples are given.

*Example 1.*

40 parts of caustic potash and 40 parts of methylic alcohol are heated for some time at about 110°. At this temperature 15 parts of the sodium salt of 1-cyannaphthalene-2-sulphonic acid (obtained from the 1-amino-2-naphthalenesulphonic acid, see Liebig's Annalen vol. 388, page 7) are added while stirring. The temperature of the mass is slowly increased to about 130-140° and the mass is kept at this temperature for a short time, until a test, when acidified, shows that the formation of a compound, insoluble in cold water and in dilute solutions of alkali carbonates, but soluble in ether, is finished. Then the mass is poured on ice, the precipitate thus formed is filtered and washed with water. When recrystallized from water or benzene the 2-methoxy-naphthalene-1-carboxyamide of the probable formula:

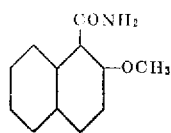

thus obtained forms long colorless needles, melting at 189°, as described in literature. It has been formerly prepared by Gattermann (cf. Liebig's Annalen, vol. 244, page 75) in a complicated manner, unfit for technical purposes, by reacting with ureachloride and aluminium-chloride on β-naphtholether.

When using caustic potash in presence of ethylic or butylic alcohol in this process the corresponding ethoxy- and butyloxy-compounds are obtained.

Example 2.

40 parts of caustic potash and 25 parts of methylic alcohol are heated for some time at about 80°. At this temperature 10 parts of the sodium salt of 2-cyannaphthalene-1-sulphonic acid are added. The temperature of the mass is increased to about 100-120° and the mass is kept for a short time at this temperature, until a test as described in the foregoing example shows the formation of a compound insoluble in dilute solutions of alkali carbonates. Then it is cooled down and diluted with water. Thereby a precipitate is separated, which is insoluble in alkalies. It is filtered and washed with water.

The new compound, being probably the 1-methoxynaphthalene-2-carboxyamide of the formula:

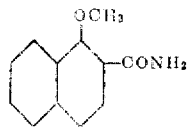

crystallizes from water or dilute alcohol as long colorless needles, melting at 156-157°.

By saponifying the new compound with alkaline acting agents, for instance by heating it with a dilute caustic soda solution, preferably with addition of alcohol, until the evolution of ammonia ceases, it is converted into the corresponding 1-methoxynaphthalene-2-carboxylic acid, which forms, when recrystallized from dilute alcohol bright needles, melting at 127°, as described in literature (see Hübner, Monatshefte fur Chemie, vol. 15, page 735).

When using other aliphatic alcohols for the process the corresponding alkoxyderivatives are formed. The same reaction takes place when using benzylalcohol or also an aromatic phenol. With polyvalent alcohols such as glycol the corresponding derivatives are formed.

Example 3.

1 part of the sodium salt of 1-cyannaphthalene-4-sulphonic acid is added at about 95° to a mixture of 4 parts of caustic potash and 6 parts of methylic alcohol. Then the mixture is heated under reflux for some hours until a test as described in example 1 shows, that the formation of a compound, insoluble in dilute solutions of alkali carbonates, is finished. After cooling down the mass is diluted with water and the separated 4-methoxy-1-naphthamide of the formula:

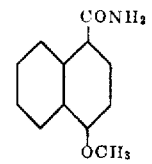

is isolated by filtration. It has the properties described in literature (cf. Gattermann, Liebigs Annalen, vol. 244, page 73, who prepared it in a complicated manner, unfit for technical purposes by reacting with ureachloride and aluminiumchloride on α-naphtholether).

When recrystallized from dilute alcohol it is obtained as colorless crystals, melting at 237°. It is insoluble in cold alkalies, when heated with caustic alkaline solutions it is converted into the corresponding carboxylic acid.

When in this process the temperature of reaction is increased to about 120° (by partly distilling off the alcohol), evolution of ammonia begins; after heating the mass for some hours at this temperature until a test, when acidified, shows that the formation of a compound, easily soluble in dilute solutions of alkali carbonates, is finished, the formed 4-methoxy-1-naphthoic acid of the formula:

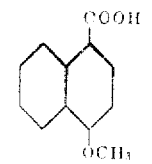

separates by diluting the mass with water and acidifying it. It is easily soluble in alkalies and melts at 239°, when recrystallized from dilute alcohol (cf. Gattermann, l. c.).

It may also be obtained when subjecting the 1-cyannaphthalene-4-sulphonic acid (see example 3 of the parent application) to the same process.

*Example 4.*

If instead of methylic-alcohol ethylic alcohol is used and the process is otherwise carried out as described in the foregoing example, the 4-ethoxy-1-naphthamide and the 4-ethoxy-1-naphthoic-acid are obtained, having the properties, described in the literature (cf. Gattermann, l. c.). The 4-ethoxy-1-naphthamide crystallizes from dilute alcohol as colorless needles, melting at 244°. It is insoluble in cold alkalies, when heated with a caustic alkaline solution the corresponding acid is formed. This 4-ethoxy-1-naphthoic-acid crystallizes from dilute alcohol as colorless needles, melting at 214°. It is easily soluble in alkalies.

*Example 5.*

When using n-butylic alcohol instead of methylic alcohol and carrying out the reaction otherwise as described in the foregoing examples, at first the 4-n-butyloxy-1-naphthamide of the formula:

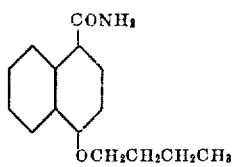

is obtained. The new compound crystallizes from spirit in silver shining needles, melting at 250°.

By increasing the temperature of the reaction the corresponding 4-n-butyloxy-1-naphthoic acid of the formula:

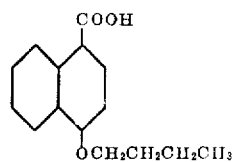

is obtained, being also a new compound, crystallizing from spirit as colorless needles and melting at 208°.

In an analogous manner alkyloxy-compounds of higher fatty alcohols may be produced.

Among the products of conversion, derived from ortho- and para-cyannaphthalene-sulphonic acids, herein described, the hydroxynaphthoic-acids obtainable according to the aforesaid reaction with an excellent yield and in a pure state are already known in the literature, whereas the hydroxycyannaphthalene-compounds obtainable as intermediates by this reaction, are new bodies. The alkoxynaphthamides and alkoxynaphthoic-acids are new compounds with exception of the following, which have been prepared in a complicated manner, unfit for technical purposes, as stated above:

(1) 2-methoxy-1-naphthamide, (Liebigs Annalen, vol. 244, page 75)
(2) 2-ethoxy-1-naphthamide, (l. c., page 75)
(3) 4-methoxy-1-naphthamide, (l. c., page 73)
(4) 4-ethoxy-1-naphthamide, (l. c., page 73)
(5) 2-methoxy-1-naphthoic acid (Bulletin 3, vol. 17, page 311)
(6) 2-ethoxy-1-naphthoic acid, (Comptes rendus, vol. 136, page 618)
(7) 1-methoxy-2-naphthoic acid (Monatshefte für Chemie, vol. 15, page 735)
(8) 4-methoxy-1-naphthoic acid, (Liebigs Annalen, vol. 244, page 73)
(9) 4-ethoxy-1-naphthoic acid, (l. c., page 73).

This application contains subject matter in common with our co-pending application Ser. No. 232,467, filed November 10, 1927.

We claim:

1. A new process for converting cyannaphthalene-sulphonic acids of the following general formula:

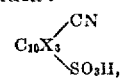

in which formula the X's mean hydrogen atoms, of which one or more may be replaced by a monovalent substituent, and the cyanogen and at least one sulphogroup stand to each other in para-position, into products of conversion of the probable formula:

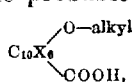

in which formula the alkoxygroup stands in para-position to the carboxylic group and the X's mean hydrogen atoms, of which one or more may be replaced by a monovalent substituent, which process comprises treating para-cyannaphthalene sulphonic acids at temperatures from about 100 to 150° C. with a caustic alkali in presence of an alcohol until a test, when acidified, shows that the product obtained is totally soluble in dilute solutions of alkali carbonates.

2. A new process for converting cyannaphthalene sulphonic acids of the following general formula:

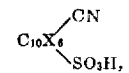

in which formula the X's mean hydrogen atoms, of which one or more may be replaced by a monovalent substituent, and the cyano- other in ortho- or para-position, into prod- gen and at least one sulphogroup stand to each ucts of conversion of the general formula:

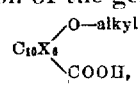

in which formula the alkoxygroup stands in ortho- or para-position to the carboxylic-group, and the X's mean hydrogen atoms, of which one or more may be replaced by a monovalent substituent, which process comprises treating cyannaphthalene-sulphonic-acids corresponding to the aforesaid formula at temperatures from about 80 to 150° C. with a caustic alkali in presence of an alcohol until a test, when acidified, shows that the product obtained is insoluble in dilute solutions of alkali carbonates, and treating the products thus obtained with saponifying agents, until a test, when acidified, shows, that the product obtained is totally soluble in dilute solutions of alkali carbonates.

3. A new process for converting 1-cyan-naphthalene-4-sulphonic acid into a product of conversion of the probable formula:

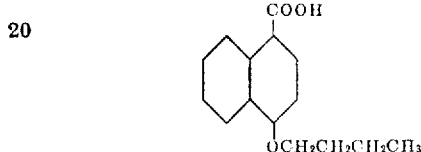

which process comprises treating the 1-cyan-naphthalene-4-sulphonic acid at temperatures from about 100 to 150° with a caustic alkali in presence of n-butylic alcohol, until a test, when acidified shows, that the product obtained is totally soluble in dilute solutions of alkali carbonates.

4. As a new compound the 4-n-butyloxy-1-naphthoic acid of the probable formula:

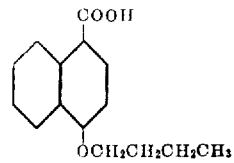

being when dry a colorless powder, crystallizing from spirit as colorless needles, easily soluble in dilute solutions of alkali carbonates, which compound is substantially identical with a product obtainable by treating the 1-cyannaphthalene-4-sulphonic acid at temperatures from about 100 to 150° with a caustic alkali in presence of n-butylalcohol, until a test, when acidified, shows, that the product obtained is totally soluble in dilute solutions of alkalicarbonates.

In testimony whereof, we affix our signatures.

RICHARD HERZ.
FRITZ SCHULTE.
WERNER ZERWECK.

CERTIFICATE OF CORRECTION.

Patent No. 1,669,297.   Granted May 8, 1928, to

RICHARD HERZ ET AL.

It is hereby certified that error appears in the printed specification of the above numbered patent requiring correction as follows: Page 3, strike out lines 124 and 125, and insert instead "gen and at least one sulphogroup stand to each other in ortho- or para-position, into prod-"; and that the said Letters Patent should be read with this correction therein that the same may conform to the record of the case in the Patent Office.

Signed and sealed this 5th day of June, A. D. 1928.

(Seal)

M. J. Moore,
Acting Commissioner of Patents.

ortho- or para-position to the carboxylic-group, and the X's mean hydrogen atoms, of which one or more may be replaced by a monovalent substituent, which process comprises treating cyannaphthalene-sulphonic-acids corresponding to the aforesaid formula at temperatures from about 80 to 150° C. with a caustic alkali in presence of an alcohol until a test, when acidified, shows that the product obtained is insoluble in dilute solutions of alkali carbonates, and treating the products thus obtained with saponifying agents, until a test, when acidified, shows, that the product obtained is totally soluble in dilute solutions of alkali carbonates.

3. A new process for converting 1-cyan-naphthalene-4-sulphonic acid into a product of conversion of the probable formula:

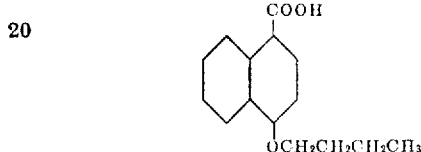

which process comprises treating the 1-cyan-naphthalene-4-sulphonic acid at temperatures from about 100 to 150° with a caustic alkali in presence of n-butylic alcohol, until a test, when acidified shows, that the product obtained is totally soluble in dilute solutions of alkali carbonates.

4. As a new compound the 4-n-butyloxy-1-naphthoic acid of the probable formula:

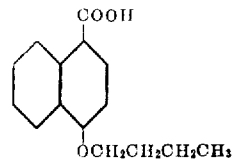

being when dry a colorless powder, crystallizing from spirit as colorless needles, easily soluble in dilute solutions of alkali carbonates, which compound is substantially identical with a product obtainable by treating the 1-cyannaphthalene-4-sulphonic acid at temperatures from about 100 to 150° with a caustic alkali in presence of n-butylalcohol, until a test, when acidified, shows, that the product obtained is totally soluble in dilute solutions of alkalicarbonates.

In testimony whereof, we affix our signatures.

RICHARD HERZ.
FRITZ SCHULTE.
WERNER ZERWECK.

---

CERTIFICATE OF CORRECTION.

Patent No. 1,669,297.  
Granted May 8, 1928, to

RICHARD HERZ ET AL.

It is hereby certified that error appears in the printed specification of the above numbered patent requiring correction as follows: Page 3, strike out lines 124 and 125, and insert instead "gen and at least one sulphogroup stand to each other in ortho- or para-position, into prod-"; and that the said Letters Patent should be read with this correction therein that the same may conform to the record of the case in the Patent Office.

Signed and sealed this 5th day of June, A. D. 1928.

(Seal)

M. J. Moore,
Acting Commissioner of Patents.